US005263435A

United States Patent [19]

Takahashi

[11] Patent Number: 5,263,435

[45] Date of Patent: Nov. 23, 1993

[54] VOLUTE HORN AND METHOD OF MANUFACTURING

[75] Inventor: Hidefumi Takahashi, Kiryu, Japan

[73] Assignee: Mitsuba Electric Manufacturing Co., Ltd., Gunma, Japan

[21] Appl. No.: 928,404

[22] Filed: Aug. 12, 1992

[51] Int. Cl.[5] .......... G01K 9/00; H04R 31/00

[52] U.S. Cl. .......... 116/142 R; 29/445; 340/391

[58] Field of Search .......... 116/142 R, 142 FP, 59; 29/594; 340/388, 404, 391

[56] References Cited

U.S. PATENT DOCUMENTS 3,090,349 5/1963 Chow et al. .......... 116/142 R
4,135,473 1/1979 Frigo .......... 340/404 X
4,199,752 4/1980 Lucas et al. .......... 340/388
4,433,750 2/1984 Neese .......... 116/59 X

FOREIGN PATENT DOCUMENTS 51-36458 9/1976 Japan .
58-5100 1/1983 Japan .
58-46039 10/1983 Japan .

*Primary Examiner*—Daniel M. Yasich
*Attorney, Agent, or Firm*—Oliff & Berridge

[57] ABSTRACT

A volute horn is assembled by integrally attaching a horn body to a resonating device forming a volute sound path. The horn body includes a vibration generating unit for vibrating diaphragm to create a sound, and a cover facing the outer surface of the diaphragm provided so as to block an opening in a housing. The resonating device is formed of a frame and a base. The frame is formed so that the bottom of the sound path is open, and the base is integrally secured to the bottom of the frame so as to block the sound path in an airtight manner. A first opening is formed in the cover, and a second opening is formed in the base. Sound produced by vibrating the diaphragm is transmitted through the first and second openings and into the volute sound path. The first opening communicates with the second opening in an airtight manner.

16 Claims, 4 Drawing Sheets

VOLUTE HORN AND METHOD OF MANUFACTURING

BACKGROUND OF THE INVENTION

1. Field of the Invention

The present invention relates to a volute horn attached to a vehicle, such as an automobile, and to its method of manufacture.

2. Description of the Related Art

In a typical volute horn, a vibration generating unit vibrates a diaphragm member attached to a horn body causing a sound to be created. The sound is adjusted in a resonating unit and then transmitted to the outside as a horn sound. The resonating unit forms a volute path along which the sound travels.

Referring to FIG. 3, a conventional volute horn 5 is shown in which a cover 4 is interposed between a diaphragm 3 and the frame 6 of a resonating device so that the bottom of the sound path, which is open to the frame, is blocked. Horn body 1 includes a vibration generating unit 3*a* disposed within a housing 2. To assemble the conventional horn, the cover 4 is first attached to the horn body so that an air vibration chamber is formed. The frame 6 of the resonating device is then attached to the outer surface of the cover 4. With such a method of manufacture, it is difficult to form a high-quality resonating device, which does not impair the quality or loudness of the sound. Namely, it is difficult to bond the outer surface of the cover 4 to the bottom of the frame 6 of the resonating device in an airtight manner. The closer the bond is to being airtight, the better the quality of the sound. In addition, to determine whether these components are bonded in a sufficiently airtight manner, the volute horn is tested only after complete assembly. If the bonding is found to be defective, the entire volute horn including the horn body is rejected, thus decreasing yield and productivity, and therefore increasing cost.

In another manufacturing method, a base member is bonded and fixed in an airtight manner to the bottom of the frame of the resonating device, which bottom serves as the bottom of the sound path, so that the sound path is blocked. The thus-formed resonating device is then attached to the horn body. In such a volute horn, an air vibration chamber is formed between the horn body and the base itself, which blocks the sound path. Fine adjustment of sound quality, including the adjustment of a gap A, cannot be done before the air vibration chamber is formed, that is, before the resonating device is attached to the horn body. It must therefore be done after the resonating device has been attached. However, when the fine adjustment is made after the resonating device has been attached, the frame of the resonating device blocks the resonating device side of an armature at the center of the diaphragm. Therefore, a gap sensor cannot be disposed on the resonating device side. As a result, adjusting and testing of sound quality become extremely troublesome and complicated. Examples of volute horn devices include Japanese Utility Model Publication No. 5100 (1983), Japanese Patent Publication No. 46039 (1983), and Japanese Utility Model Publication No. 36458 (1976).

SUMMARY OF THE INVENTION

Accordingly, it is an object of the present invention to provide a volute horn and method of manufacture which overcomes the above-described problems in the prior art.

It is another object of the present invention to provide a volute horn which is capable of producing a consistent high quality horn sound.

It is another object of the present invention to provide a method of manufacturing a volute horn in which the number of manufacturing steps is minimized.

It is yet another object of the present invention to provide a method of manufacturing a volute horn in which the quality of the horn body and the resonating device can be checked before attachment.

These and other objects of the present invention are attained by providing a volute horn and a method of its manufacture including a horn body having a vibration generating unit disposed in a housing, the vibration generating unit vibrating a diaphragm which is arranged to block an opening in the housing, the horn body further including a cover disposed adjacent the diaphragm on an opposite side of the housing and a resonating device having a frame and a base and forming a volute sound path, the base being integrally secured to the frame by ultrasonic welding so as to seal the sound path in an airtight manner, wherein the resonating device is secured to the horn body.

A first opening is formed in the cover and a second opening is formed in the base. The openings are axially aligned and communicate in an airtight manner. Sound produced by vibrating the diaphragm is transmitted through the openings and into the sound path.

An annular reservoir groove and a step portion are formed at the periphery of the second opening. The annular reservoir groove is adapted to store an adhesive and facilitate joining the horn body and the resonating unit. The step portion is adapted to accommodate an edge portion of the cover. The edge portion prevents the adhesive in the annular reservoir groove from entering the sound path and affecting the quality of the sound.

A mating portion is adapted to be mated with an outer periphery of the horn body and is formed at an outer periphery of the base. The mating portion has a projection which securely grasps the periphery of the cover.

BRIEF DESCRIPTION OF THE DRAWINGS

Other objects and advantages will become apparent in view of the following detailed description of preferred embodiments when taken in conjunction with the accompanying drawings, in which.

DETAILED DESCRIPTION OF PREFERRED EMBODIMENTS

Figure 1:
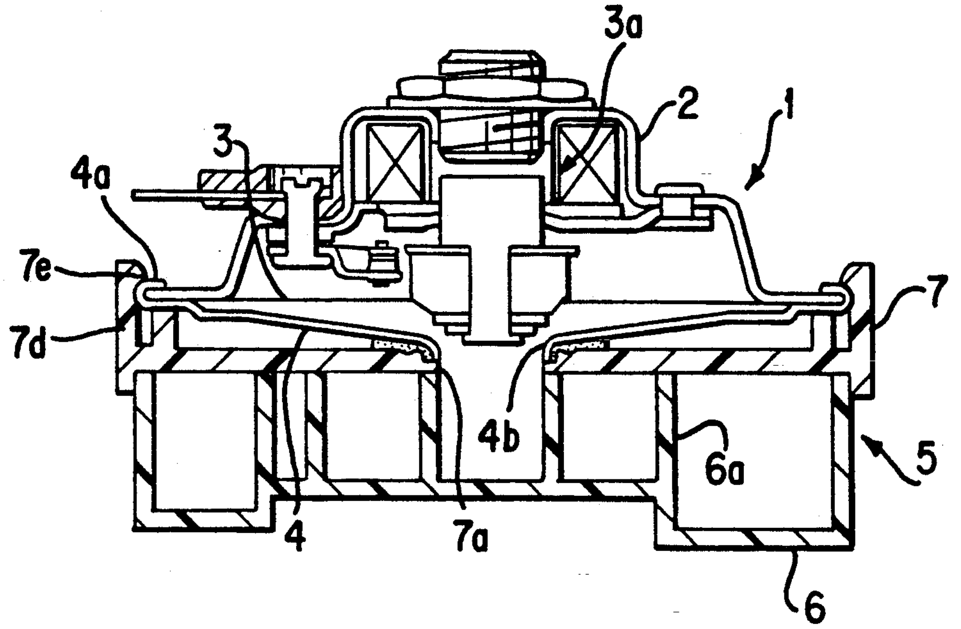
FIG. 1 is a sectional view of a volute horn.
Figure 2:
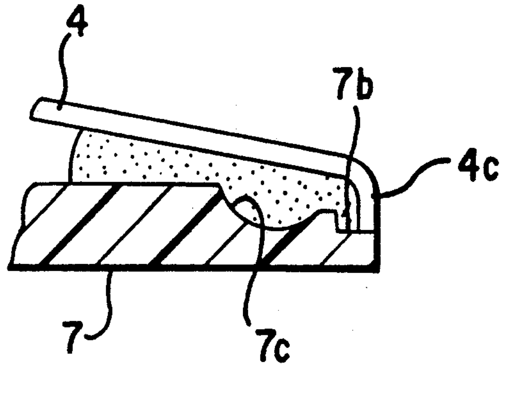
FIG. 2 is an enlarged sectional view of a bond portion.
Figure 3:
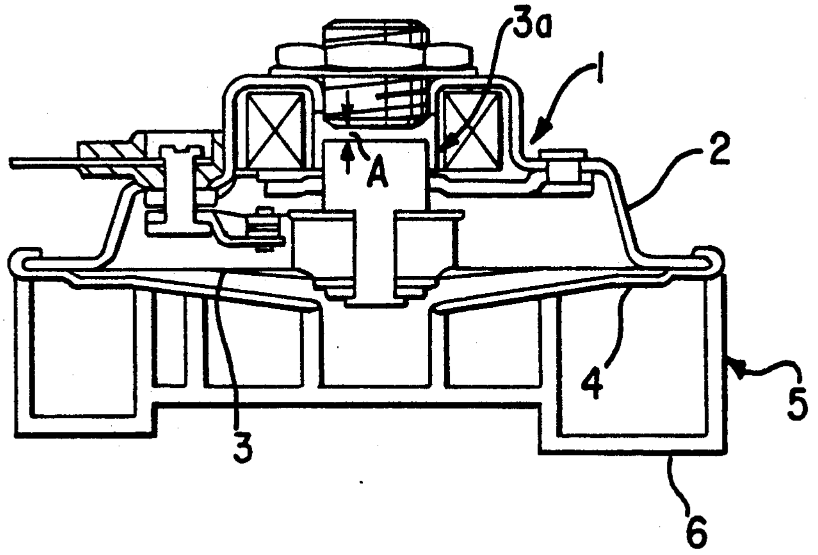
FIG. 3 (PRIOR ART)
FIG. 3 is a sectional view of a conventional volute horn.

Preferred embodiments of the present invention will be described below with reference to the accompanying drawings. Referring to FIG. 1, a vehicle volute horn body 1 has a vibration generating unit 3*a* disposed in a housing 2. The vibration generating unit uses an electromagnet to vibrate a diaphragm 3, which is arranged so as to block an opening in housing 2. The periphery of diaphragm 3 is clamped between a periphery of housing 2 and a periphery 4*a* of a cover 4 facing the outer surface of diaphragm 3. In other words, periphery 4*a* of cover 4 is bent in a locking or caulking manner so as to clamp housing 2 and diaphragm 3. An opening 4*b*, through which sound is transmitted to the outside, is formed at the center of cover 4. The periphery of opening 4*b* includes an edge portion 4*c* which projects outward (FIG. 2).

Figure 4:
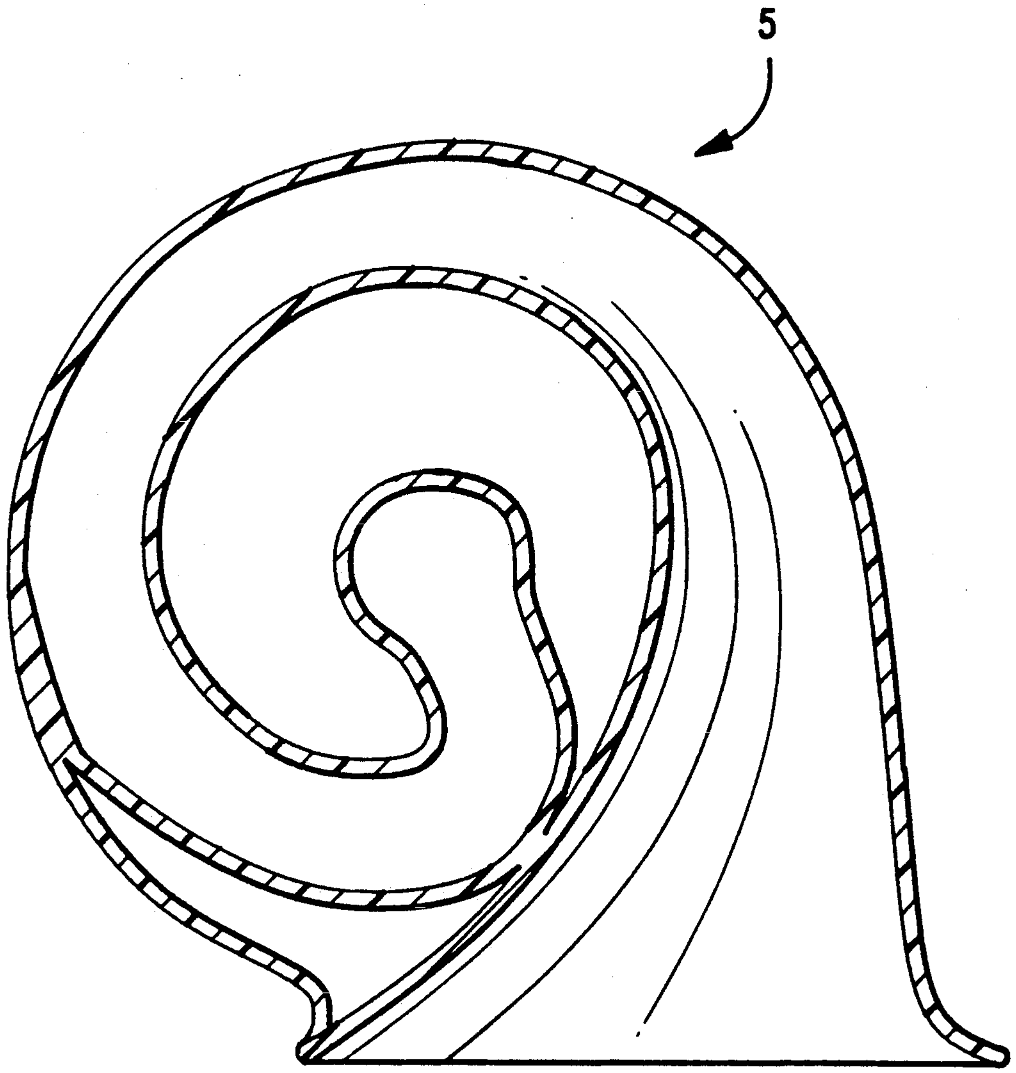
FIG. 4 is a cross section of a sound path of a volute horn.

A resonating device 5 (FIG. 4) forms a volute sound path. Resonating device 5 is formed of a frame 6 and a base 7. Frame 6 has a wall 6*a* which defines the sound path, whose bottom is open. Base 7 is secured to the bottom of frame 6 so as to seal the sound path in an airtight manner. Frame 6 and base 7 are made of the same resin material, and are integrally secured to each other by ultrasonic welding.

An opening 7*a*, through which sound produced by diaphragm 3 is transmitted, is formed at the center of base 7. A step portion 7*b* (FIG. 2) is formed at the lower periphery of opening 7*a*. An annular reservoir groove 7*c* for storing an adhesive is formed adjacent step portion 7*b*.

A cylindrical mating portion 7*d* which projects upward in FIG. 1 is formed at the outer periphery of base 7. Mating portion 7*d* is mated with periphery 4*a* of cover 4. A projection 7*e* formed at the inner periphery of mating portion 7*d* engages with periphery 4*a*. Such a structure permits resonating device 5 to securely mate and engage with horn body 1.

A method of manufacturing a volute horn of the present invention will now be described. Horn body 1 is assembled with vibration generating unit 3*a* disposed within housing 2. Resonating device 5 is formed by joining frame 6 to base 7 by ultrasonic welding. Annular reservoir groove 7*c* is formed at the periphery of opening 7*a* in base 7, which groove 7*c* facilitates the application of the adhesive. Step portion 7*b* is formed adjacent the annular reservoir groove at the periphery of opening 7*a*. Step portion 7*b* is adapted to accommodate edge portion 4*c* of cover 4. This arrangement makes it possible not only to reduce the number of steps for manufacturing the volute horn, but also to automatically apply the adhesive.

Figure 5:
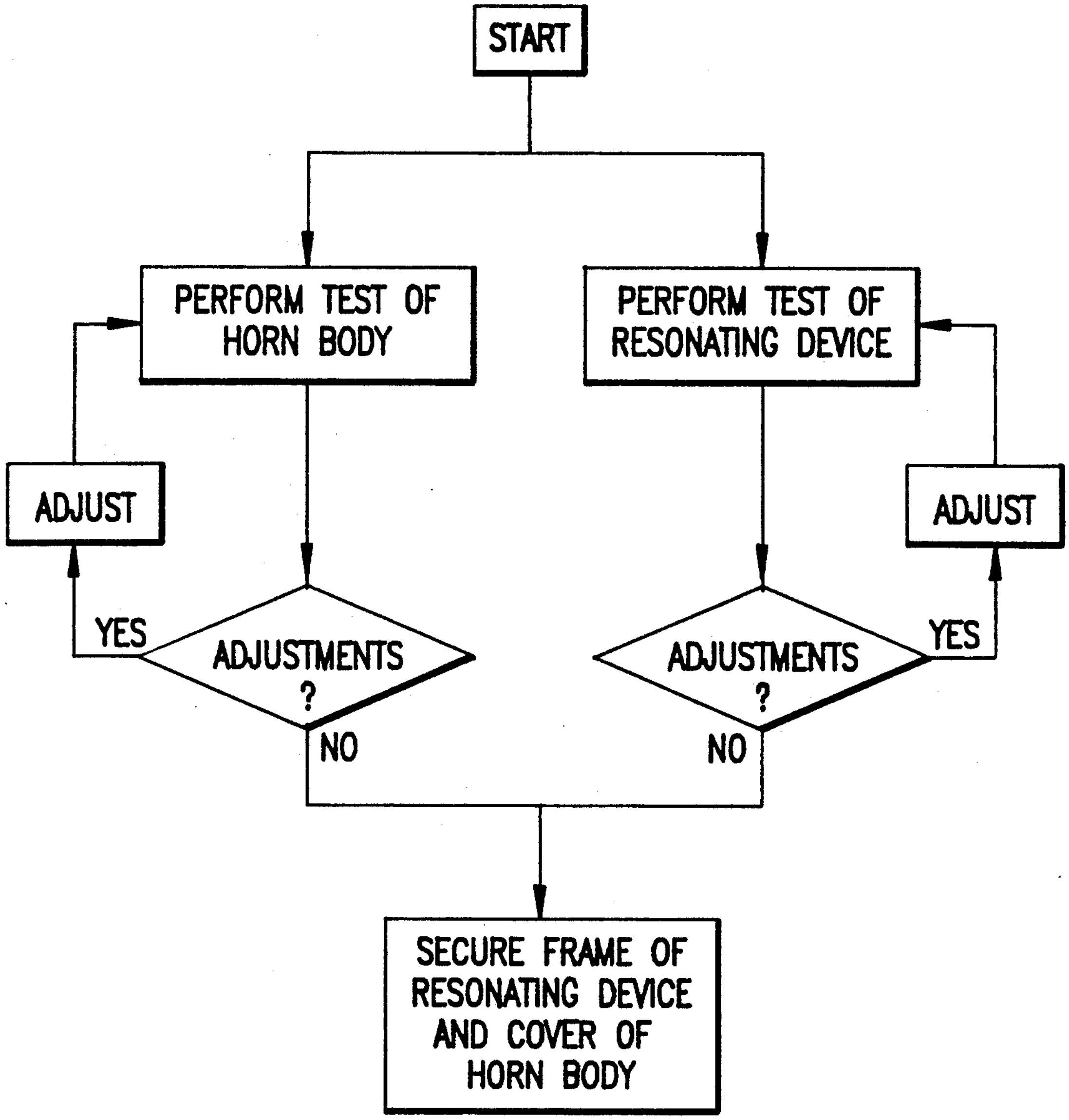
FIG. 5 is a flow chart illustrating the testing of the horn and resonating device.

After forming annular reservoir groove 7*c* and step portion 7*b*, the quality of resonating device 5 is tested and necessary fine adjustments are made. Referring to FIG. 5, testing of the quality of horn body 1 is performed separately from testing of the quality of resonating device 5. After quality requirements are achieved, horn body 1 and resonating device 5 are attached to each other.

The adhesive is introduced into annular reservoir groove 7*c*, and then periphery 4*a* of cover 4 is mated with mating portion 7*d* of resonating device 5. While the adhesive is being pressed by the mating operation mentioned above, edge portion 4*c* of cover 4, which portion is in contact with step portion 7*b*, controls the adhesive so that it does not enter into the sound path. At the same time, because of capillarity, the adhesive permeates into a small gap (approximately 1 mm) between cover 4 and base 7, resulting in a reliable bond.

Because resonating device 5 includes frame 6 and base 7 joined by ultrasonic welding and made of the same resin material, resonating device 5 is airtight. In addition, the adhesive for joining the horn body and the resonating device is prevented from entering the sound path by edge portion 4*c*, and therefore sound quality and durability of the volute horn are improved.

Mating portion 7*d* for mating with and holding the periphery of horn body 1 is formed at the periphery of base 7 of resonating device 5. Because of such a structure, horn body 1 can be attached to resonating device 5 simply by bonding the periphery of opening 4*b* in cover 4 to the periphery of opening 7*a* in base 7. As a result, the number of steps for manufacturing the volute horn is minimized. In addition, cover 4 is reliably bonded to base 7 because the portion where these components are bonded together is pressed by the mating operation described above.

Although the present invention has been described in detail, it will be apparent to those skilled in the art that various modifications may be made without departing from the scope of the invention, which is defined in the following claims.

What is claimed is:

1. A volute horn comprising:

a horn body having a vibration generating unit disposed on one side of a housing, said vibration generating unit vibrating a diaphragm, said horn body further comprising a cover disposed adjacent said diaphragm on an opposite side of said housing, wherein said diaphragm is arranged to block an opening in said housing;

a resonating device having a frame and a base and forming a volute sound path, said base being integrally secured to said frame so as to seal said sound path in an airtight manner, wherein said frame of said resonating device is secured to said cover of said horn body; and a first opening formed in said cover and a second opening formed in said base, said first and second openings being axially aligned and communicating in an airtight manner, wherein sound produced by vibrating said diaphragm is transmitted through said first and second openings into said volute sound path.

2. A volute horn according to claim 1, wherein said base is integrally secured to said frame by ultrasonic welding.

3. A volute horn according to claim 2, wherein said frame and said base are formed of a resin material.

4. A volute horn according to claim 3, wherein said frame and said base are formed of the same resin material.

5. A volute horn according to claim 1, wherein a mating portion to be mated with an outer periphery of said horn body is formed at an outer periphery of said base, and wherein a periphery of said first opening formed in said cover communicates in an airtight manner with a periphery of said second opening formed in said base.

6. A volute horn according to claim 5, wherein an annular reservoir groove for storing an adhesive is formed at the periphery of said second opening in said base.

7. A volute horn according to claim 6, wherein a step portion is formed adjacent said annular reservoir groove at a lower periphery of said second opening in said base, said step portion arranged to accommodate an edge portion formed at the periphery of said first opening in said cover, said edge portion being in contact with the periphery of said second opening in said base and confining the adhesive so that the adhesive does not enter into said sound path.

8. A volute horn according to claim 5, wherein an edge portion is formed at the periphery of said first opening in said cover, said edge portion being in contact with the periphery of said second opening in said base and confining a adhesive from entering into said sound path.

9. A volute horn according to claim 8, wherein a gap is formed between said base and said edge portion of said cover, said adhesive being disposed in a portion of said gap.

10. A method of manufacturing a volute horn, comprising the steps of:

forming a horn body, said horn body being formed by the steps of arranging a vibration generating unit on one side of a housing, said vibration generating unit vibrating a diaphragm, and attaching a cover adjacent said diaphragm on an opposite side of said housing;

arranging said diaphragm to block an opening in said housing;

forming a resonating device having a volute sound path, said resonating device being formed by the step of integrally securing a base to a frame so as to seal said sound path in an airtight manner;

securing said frame of said resonating device to said cover of said horn body;

forming a first opening in said cover; and forming a second opening in said base, said first and second openings being axially aligned and communicating in an airtight manner, wherein sound produced by vibrating said diaphragm is transmitted through said first and second openings into said volute sound path.

11. A method of manufacturing a volute horn according to claim 10, wherein a periphery of said first opening formed in said cover is bonded in an airtight manner to a periphery of said second opening formed in said base.

12. A method of manufacturing a volute horn according to claim 11, further comprising the steps of:

applying an adhesive to the periphery of said second opening;

mating a mating portion formed at an outer periphery of said base with an outer periphery of said horn body; and bonding the periphery of said first opening to the periphery of said second opening.

13. A method of manufacturing a volute horn according to claim 10, wherein said base and said frame are integrally secured by the step of joining said base and said frame by ultrasonic welding.

14. A method of manufacturing a volute horn according to claim 13, wherein said base and said frame are formed of a resin material.

15. A method of manufacturing a volute horn according to claim 14, wherein said base and said frame are formed of the same resin material.

16. A method of manufacturing a volute horn according to claim 10, wherein before said securing step, further comprising the steps of:

testing said horn body; and testing said resonating device, wherein if adjustments are necessary to satisfy quality requirements of said horn body or said resonating device, said adjustments are performed prior to said securing step.

* * * * *